US009533626B2

(12) United States Patent
Forni et al.

(10) Patent No.: US 9,533,626 B2
(45) Date of Patent: Jan. 3, 2017

(54) METHOD AND SYSTEM FOR DETERMINING THE AVAILABILITY OF A LANE FOR A GUIDED VEHICLE

(71) Applicants: Virginie Forni, Montrouge (FR); Jean-Pol Mura, Les Ulis (FR); Clara Nogueira Alves, Issy les Moulineaux (FR)

(72) Inventors: Virginie Forni, Montrouge (FR); Jean-Pol Mura, Les Ulis (FR); Clara Nogueira Alves, Issy les Moulineaux (FR)

(73) Assignee: SIEMENS S.A.S., St. Denis (FR)

( * ) Notice: Subject to any disclaimer, the term of this patent is extended or adjusted under 35 U.S.C. 154(b) by 262 days.

(21) Appl. No.: 14/348,777

(22) PCT Filed: Sep. 18, 2012

(86) PCT No.: PCT/EP2012/068346
§ 371 (c)(1),
(2) Date: Mar. 31, 2014

(87) PCT Pub. No.: WO2013/045315
PCT Pub. Date: Apr. 4, 2013

(65) Prior Publication Data
US 2014/0247356 A1 Sep. 4, 2014

(30) Foreign Application Priority Data
Sep. 30, 2011 (EP) .................................. 11290457

(51) Int. Cl.
*B60R 11/04* (2006.01)
*B61L 23/04* (2006.01)

(52) U.S. Cl.
CPC .............. *B60R 11/04* (2013.01); *B61L 23/041* (2013.01)

(58) Field of Classification Search
None
See application file for complete search history.

(56) References Cited

U.S. PATENT DOCUMENTS 4,709,265 A * 11/1987 Silverman ................ B62D 1/28
348/158
6,163,755 A * 12/2000 Peer ....................... B61L 23/041
340/436

(Continued)

FOREIGN PATENT DOCUMENTS

CN 1214656 A 4/1999
CN 201296263 Y 8/2009

(Continued)

OTHER PUBLICATIONS

Wang Yao "Image Based Intelligent Recognition for Environment Status of High Speed Railway Lines", Sec. 2.1-2 and 5, 2010.

(Continued)

Primary Examiner — Reza Aghevli
(74) Attorney, Agent, or Firm — Laurence Greenberg; Werner Stemer; Ralph Locher

(57) ABSTRACT

A method and a system determine track availability. The system is configured to be fitted to a guided vehicle liable to move downstream on a track. The system contains at least one camera able to capture images of a downstream section of track. The downstream section being a track portion extending from a first point of the track located downstream of the guided vehicle to a second point of the track located downstream of the guided vehicle. The distance separating the camera from the second point is being greater than the distance separating it from the first point. At least one image processing and analysis device is provided and is able to analyze each image taken by each camera, to locate the downstream section therein, to determine first a downstream (Continued)

safety distance, and second an availability state of the track between the first point and the second point.

15 Claims, 1 Drawing Sheet

(56) References Cited

U.S. PATENT DOCUMENTS

| | | | | |
|---|---|---|---|---|
| 7,999,848 B2 * | 8/2011 | Chew | ................ | B61K 9/08 |
| | | | | 348/143 |
| 8,330,818 B2 * | 12/2012 | Cheng | ................ | G06T 7/2033 |
| | | | | 348/144 |
| 9,221,481 B2 * | 12/2015 | Desbordes | ............ | B61L 25/021 |
| 2002/0003571 A1 * | 1/2002 | Schofield | ................ | B60C 23/00 |
| | | | | 348/148 |
| 2006/0098843 A1 | 5/2006 | Chew | | |
| 2007/0217670 A1 * | 9/2007 | Bar-Am | ................ | B61K 9/08 |
| | | | | 382/141 |
| 2009/0244279 A1 * | 10/2009 | Walsh | ................ | B60R 11/04 |
| | | | | 348/143 |
| 2010/0027841 A1 | 2/2010 | Sebastian et al. | | |
| 2010/0090135 A1 | 4/2010 | Kumar | | |
| 2011/0106380 A1 * | 5/2011 | Wang | ................ | B60R 1/00 |
| | | | | 701/36 |

FOREIGN PATENT DOCUMENTS

| | | | | |
|---|---|---|---|---|
| CN | 201825066 U | | 5/2011 | |
| DE | 19746970 A1 | | 4/1999 | |
| DE | WO 2004/028881 | * | 4/2004 | ............. B61L 23/04 |
| DE | 102005029956 A1 | | 2/2006 | |
| DE | 202006012637 U1 | | 11/2006 | |
| DE | WO 2010/083946 | * | 7/2010 | ............. G01C 15/00 |
| WO | 02058984 A1 | | 8/2002 | |
| WO | 2004028881 A1 | | 4/2004 | |
| WO | 2005120924 A1 | | 12/2005 | |
| WO | 2010083946 A1 | | 7/2010 | |

OTHER PUBLICATIONS

Frank Kruse et al: "Multi Sensor System for Obstacle Detection in Train Applications", German Radar Symposium Proceedings, X, XX, Sep. 3, 2002 (Sep. 3, 2002), pp. 477-481, XP009085351.

* cited by examiner

METHOD AND SYSTEM FOR DETERMINING THE AVAILABILITY OF A LANE FOR A GUIDED VEHICLE

BACKGROUND OF THE INVENTION

Field of the Invention

The present invention relates to a method and system for determining track availability for a guided vehicle.

"Guided vehicle" refers in particular to public transport means such as buses, trolleybuses, streetcars, subways, trains or train units, etc., as well as load-transporting means such as, for example, overhead traveling cranes, for which safety is a very important factor and which are guided specifically by at least one rail that defines at least one track, i.e. at least one path to be followed by said transport means. In particular, the present invention relates to the railway domain, in particular to entirely automatic transport means, as well as transport means fitted with a control system based on remote communication, for example trains fitted with a radio train control system, commonly referred to as "communication-based train control" (CBTC).

An important safety criterion relating to the movement of a guided vehicle involves checking the availability of a track section before it is taken by said guided vehicle. Indeed, each guided vehicle is only authorized to move on a track section if this latter is available, i.e. it is free of all obstacles liable to impede the movement of said guided vehicle or to jeopardize the safety thereof. Checking the availability of a track section in this manner in particular guarantees a minimum separation distance between two guided vehicles and is a key criterion in managing guided-vehicle traffic on a transport network.

The availability of a track can be checked using different means known to the person skilled in the art. For example, a track circuit is a device able to detect the presence of a guided vehicle on the rails of a track section using the contact of a first wheel of the guided vehicle with a first rail of said track section, and of a second wheel attached to the same axle as said first wheel with a second rail of said track section such as to form an electrical connection between the first and second rails (the wheel and the axle being conductive), said connection causing a short circuit that can be detected by said track circuit, enabling the presence of said guided vehicle on said track section to be flagged. Unfortunately, the correct operation of the track circuit depends on the length of said track section, the conducting state between the wheels of the guided vehicles and the rails of the track and the ambient conditions, and it also requires a track section that is electrically isolated from the rest of the track and includes at least two rails to form an electrical circuit. Another device known to the person skilled in the art that is used to check the availability of a track section is the axle counter. This device incorporates two detectors, a first detector placed at one end of the track section, and a second detector placed at another end of the track section, each detector being able to count the number of axles that pass it. Thus, by comparing the number of axles that pass the first and second detectors, it is possible to determine whether a guided vehicle is still on said track section, or has left said track section. Unlike a track circuit, an axle counter is not affected by the length of the track section to be monitored. On the other hand, for a track section of equal length, it is more costly to implement than a track circuit. Moreover, certain parts of the guided vehicle are liable to generate false axle counts, thereby needlessly blocking a track section.

BRIEF SUMMARY OF THE INVENTION

One object of the present invention is to propose a method and a system for checking the availability of a track or track section that are simple, safe and reliable, easily adaptable to all types of guided vehicle and tracks, and good value, and that overcome the drawbacks of a track circuit and an axle counter.

Another object of the present invention is in particular to guarantee determination of the availability of a track or track section that reaches safety level SIL2 to SIL 4, i.e. one that has a probability of dangerous failure per hour of between $10^{-6}$ and $10^{-9}$.

The present invention proposes a system for determining track availability in real time that is designed to be fitted to a guided vehicle liable to move downstream on a track (2), said system comprising:
  at least one camera able to capture in real time at least one image of a downstream section of said track, said downstream section being a track portion extending from a first point of said track located downstream of said guided vehicle to a second point of said track located downstream of said guided vehicle, in which said camera can in particular be mounted at one end of said guided vehicle, for example on the front of the train, the distance separating the camera, and therefore the guided vehicle, from the second point being greater than the distance separating it from said first point, and in which said track can in particular be modeled by one or more sets of points, each point being characterized by a position (or coordinate) such that each set of points can define at least one geometric shape able to model at least one element of said track, for example a rail of said track can be defined by a set of points forming a curve and representing said rail;
  at least one image analysis and processing device able to automatically analyze each image taken by each camera, to locate said downstream section therein, to determine in real time firstly a downstream safety distance, in particular as a function of the guided vehicle and the movement features thereof, and secondly an availability state of the track between said first point and said second point.

Moreover, the present invention proposes a method for determining track availability in real time designed to determine the availability of a track for a guided vehicle liable to be moving downstream, said method including the following stages:
  the capture by a camera of at least one image of a downstream section of said track, said downstream section being a track portion extending from a first point of said track located downstream of said guided vehicle to a second point of said track located downstream of said guided vehicle, the distance separating the camera from the second point being greater than the distance separating it from said first point;
  automatic processing and analysis of each image captured by said camera in order to locate said track in each image captured, to determine a downstream safety distance and an availability state of the track between said first point and said second point.

Preferably, said processing and said analysis of each image may in particular include at least one of the following stages:
  digitizing of each image captured to transform said captured image into a format that can be used to localize said track;

recognition of said downstream section in said image acquired by said camera by means of an object recognition algorithm and localization of said downstream section in relation to said camera;

determination of a downstream safety distance and determination of an availability state of the track between said first point and said second point using localization data obtained by localizing said downstream section of said track in relation to said camera.

Preferably, the recognition algorithm is able to recognize at least one part of said downstream section of said track in each image and to localize all of said downstream section of said track in each image, in particular using a geometric recognition technique on a track section, using for example an automatic learning technique such as boosting, said recognition technique cooperating with a localization technique in order to localize each point of the track section in relation to the camera, i.e. the relative location or position of each point in relation to the camera can be determined using said localization technique according to the invention, thereby enabling the location or position thereof in relation to the guided vehicle to be determined.

Preferably, and in order to recognize said downstream section in an image acquired by the camera, said recognition algorithm is in particular able to make a correlation or match between a set of pixels of an image captured by said camera showing some or all of said downstream section of the track and a set of features of the tracks, in which said features may be previously saved in a database of the system according to the invention and can define for example specific geometric shapes of said track intended to enable said track or one of the sections thereof to be recognized.

Preferably, said method according to the invention may in particular include an initial learning phase intended to create said database. In this case, this latter includes at least some examples of images of track sections to be used in the automatic learning process related to recognition of the downstream section using the recognition algorithm, in particular according to said boosting technique. This database may for example include a set of images that were acquired by said camera mounted on said guided vehicle when this latter was moving, during said initial learning phase, along said track including said downstream section, said images acquired being used subsequently as example images (i.e. typical images representing a track section, in particular said downstream section) of said track section on which said guided vehicle is likely to run and that are used during said learning process. These example images are in particular then used by the recognition algorithm to learn to recognize some or all of a track section, and are subsequently used to recognize the downstream section of said track.

In particular, once said learning phase is complete, said database is then preferably used to determine in real time the availability state of the downstream section of the track, the data in said database being used in particular to rapidly recognize and localize said track section.

Advantageously, said database is upgradable and adaptive in that, once said initial learning phase is complete, it can be updated in real time using other images acquired by said camera during subsequent runs of said guided vehicle along said track.

The stage in which said downstream section is localized in relation to the camera may preferably be performed using at least one of the localization techniques described below, either once said downstream track section has been completely recognized from the image acquired by the camera or once a part of said downstream track section has been recognized. Localization in particular means determination of the position of each point of the downstream section in relation to said camera.

According to a first preferred embodiment, said database includes a set of geographical coordinates intended to describe and determine the terrestrial position of the points forming said track. In particular, this set of geographical coordinates advantageously makes it possible to determine the position of said guided vehicle on said track in real time, for example using movement speed data from said guided vehicle, for example communicated to said system according to the invention by means of a control system of the guided vehicle. Preferably, said recognition algorithm is able to take into account the position of said guided vehicle on said track in real time using the movement speed thereof and said geographical coordinates, or preferably, using localization data provided by a localization system able to indicate in real time the position of the guided vehicle, such as a GPS system, which may be built into the system according to the invention or carried on board the guided vehicle. Thus, the position of said guided vehicle relative to said set of coordinates and on said track can be determined in real time by the system according to the invention. Preferably, said downstream section may then be localized in relation to said guided vehicle using at least one localization datum once recognition of at least one part of said downstream section enables a match to be made between said part of the downstream section and said set of geographical coordinates. Thus, the real-time positioning of said guided vehicle combined with recognition of said downstream section advantageously makes it possible to associate each point of said downstream section with a geographical coordinate, and therefore to determine a localization datum intended to indicate the position of said point in relation to said camera, in particular in relation to said guided vehicle. Preferably, the processing and analysis device according to the invention is thus able to determine a track length separating said camera, and therefore said guided vehicle, from at least one third point located between said first point and said second point of said downstream section. This determination of a track length is in particular used to monitor and maintain a safety distance downstream of said guided vehicle, for example to prevent collisions between said guided vehicle and another guided vehicle, or to trigger an emergency braking procedure if there is an object on the track in a position defining a track length separating said guided vehicle from said object that is less than the downstream safety distance. In particular, said downstream safety distance may vary as a function of a movement speed of said guided vehicle or of braking features of said guided vehicle, and may in particular be automatically evaluated and compared to a track length calculated by the processing and analysis device according to the invention.

According to a second preferred embodiment, the processing and analysis device is able to detect and recognize, in particular using said recognition algorithm, in said captured image, at least one object having at least one dimensional feature that is invariable and known to said processing and analysis device (i.e. saved in said database of said system according to the invention) in order to determine, on the basis of said dimensional feature and of at least one optical feature of said camera, a distance between said object and said camera, in other words between said object and said guided vehicle.

For example, such an object could be the track itself, the dimensional features of which are invariable and known, such as the gauge of the rails or the spacing of the sleepers. Such an object could also be another guided vehicle having at least one known and invariable dimensional feature, or a sign used to measure distance that can be arranged on the trackside or attached to said other guided vehicle and configured such as to show a geometric shape that can be used to determine said distance. Notably, on the basis of the known and invariable dimensional features of the track itself and of the optical features of the camera, the processing and analysis device is able to localize said downstream section of said track by calculating for each point of said track said localization datum, which is for example a track length separating the camera, or the guided vehicle, from said point, or preferably the geographical position of said point in relation to the camera or the guided vehicle. Thus, according to the second preferred embodiment, the known and invariable dimensional features of the track are used to locate said downstream section in relation to said camera, i.e. to determine the position of the points of the downstream section in relation to said camera, once one or more track parts have been recognized in said image. Consequently, the processing and analysis device according to the invention is in particular able to determine said track length separating said camera, and therefore said guided vehicle, from at least one third point located between said first point and said second point of said downstream section. In particular, the recognition algorithm is then able to determine whether there is an object between the guided vehicle and said third point.

In particular, the track length between said camera and any object recognized by the processing and analysis device that has a dimensional feature included in the database, for example another guided vehicle, can be identified by the system according to the invention. In particular, said other guided vehicle may be fitted with said sign intended to cooperate with said processing and analysis device in order to determine said track length separating said guided vehicle from said other guided vehicle. Thus, the processing and analysis device is able to determine the distance separating said camera from an object recognized in said image acquired by the camera, having a known and invariable dimensional feature that is included in said database.

Preferably, each object which can be associated with a track, i.e. belonging to the environment of the track and/or of the guided vehicle, that has a known and invariable dimensional feature, may be listed, for example in the form of geometric parameters, in said database of said system according to the invention, in order to make it a recognized part of said image acquired by the camera by means of said recognition algorithm, and secondly, to ensure that the distance separating said object from the camera is evaluated using the dimensional feature(s) thereof and the optical features of the camera.

Preferably, the availability state of the downstream track section may in particular be determined by the processing and analysis device as follows:
  if the track length downstream of said guided vehicle, separating said first point from said second point, and calculable by the processing and analysis device, is equal to or greater than said downstream safety distance and does not include any objects liable to impede the movement of said guided vehicle, then said downstream track section is available;
  if the track length downstream of said guided vehicle, separating said first point from said second point, and calculable by the processing and analysis device, is less than said safety distance, or if there is an object liable to impede the movement of said guided vehicle at a track length less than the downstream safety distance, then said downstream track section is unavailable and in particular said unavailability may trigger an automatic process, such as braking said guided vehicle and sending for example a track availability state signal to a monitoring system of the guided vehicle.

Preferably, the track length separating said guided vehicle from an object on said track downstream of said guided vehicle that is liable to impede the movement of said guided vehicle may be determined either by measuring the distance separating said object from said guided vehicle if a dimensional feature of said object is known and invariable, or by matching the position of said object on the track and the position of one of the points of the track, given that each point of the track can be related to a localization datum indicating the position of said point in relation to the guided vehicle.

Preferably, the system according to the invention is characterized in that it includes another camera able to capture, at the same time said image is captured by said camera, at least one other image of the downstream section of said track, said camera and said other camera thus being able to cooperate with one another to create a stereo image including said image and said other image of said downstream section. The stereo image of said downstream section advantageously makes it possible to directly determine the position of the downstream section and the position of an object in relation to one or more points of said downstream section by using a three-dimensional representation technique for said downstream section, and it may be used in combination with the localization methods described above firstly to confirm the availability state of the downstream section and secondly to safely guarantee the correct localization of said downstream section.

Specifically, the system according to the invention is characterized in that it includes a radar system able to cooperate with said camera or said other camera to detect any objects occupying said downstream section that could potentially impede the movement of said guided vehicle. Advantageously, said radar system is able to securely confirm said determination of the availability state of the downstream section, notably by determining a distance separating said object from said camera. In particular, once an object has been recognized in an image acquired by said camera, a movement device of said system according to the invention is able to control the positioning of said radar system and/or of said camera as a function of a position of said downstream section or of said object in said image captured by the camera, notably to keep said image centered on said track.

Preferably, the detection of an object liable to impede the movement of the guided vehicle can be correlated to detection of a discontinuity of the track in said downstream section. Indeed, said processing and analysis device is in particular able to detect a discontinuity of said track between said first point and said second point by analyzing said image acquired by the camera. Any discontinuity of said track can in particular be analyzed by said processing and analysis device to determine whether it is being caused by occupation of said track by an object. Discontinuity refers to an analysis of the continuity of the track, for example of at least one rail of said track, or of two rails of the track, in said downstream section.

Preferably, said system according to the invention is also characterized in that the processing and analysis device is able to detect a ground signal downstream of said guided vehicle. In particular, said recognition algorithm is able to identify each ground signal appearing in an image taken by said camera. Furthermore, the processing and analysis device is in particular able to interpret information given by said ground signal identified and to communicate said information to a monitoring system of the guided vehicle or to a controller.

Preferably, said system according to the invention is characterized in that it includes a signaling device able to generate a track availability state signal that can characterize the availability state of said downstream section, said state signal having a first value when said track is available for said guided vehicle and a second value when said track is unavailable, for example when it is occupied by another guided vehicle or by an object liable to impede the movement of said guided vehicle. In particular, said system according to the invention is characterized in that it includes a communication device able to send said state signal to at least one other communication device, which may in particular be a communication device of another system for determining track availability designed to be fitted to another guided vehicle or a communication device on the ground, fitted for example to a central control position of one or more guided vehicles. Advantageously, the exchange between guided vehicles of said state signal enables the system according to the invention to update in real time the state of the network of tracks on which the guided vehicle to which it is fitted is liable to run.

Preferably, said system according to the invention includes at least one supplementary camera configured to capture at least one image of an upstream section of said track, said upstream section being a track portion extending from another first point of said track located upstream of said guided vehicle to another second point of said track located upstream of said guided vehicle, the distance separating the guided vehicle from said other second point being greater than the distance separating it from said other first point. In particular, the processing and analysis device is able to analyze each image acquired by said supplementary camera in order to determine whether the guided vehicle has left said downstream section. Advantageously and in particular, the processing and analysis device can communicate to other guided vehicles, via said communication devices, a signal able to indicate that said guided vehicle has left said downstream track section.

Finally, the present invention also claims a guided vehicle characterized in that it includes said system for determining track availability according to the invention, as well as a sign used to measure distance intended to cooperate with the system for determining track availability and designed to be able to be attached to a supporting element of a surface, for example an external surface, of another guided vehicle or beside the track, including a geometric shape dimensioned to enable the system for determining track availability to determine a distance between said sign and said guided vehicle, for example a set of three discs each arranged on top of a triangle, the height and width of which can then be used to determine a distance separating said sign and said camera.

DESCRIPTION OF THE INVENTION

Figure 1:
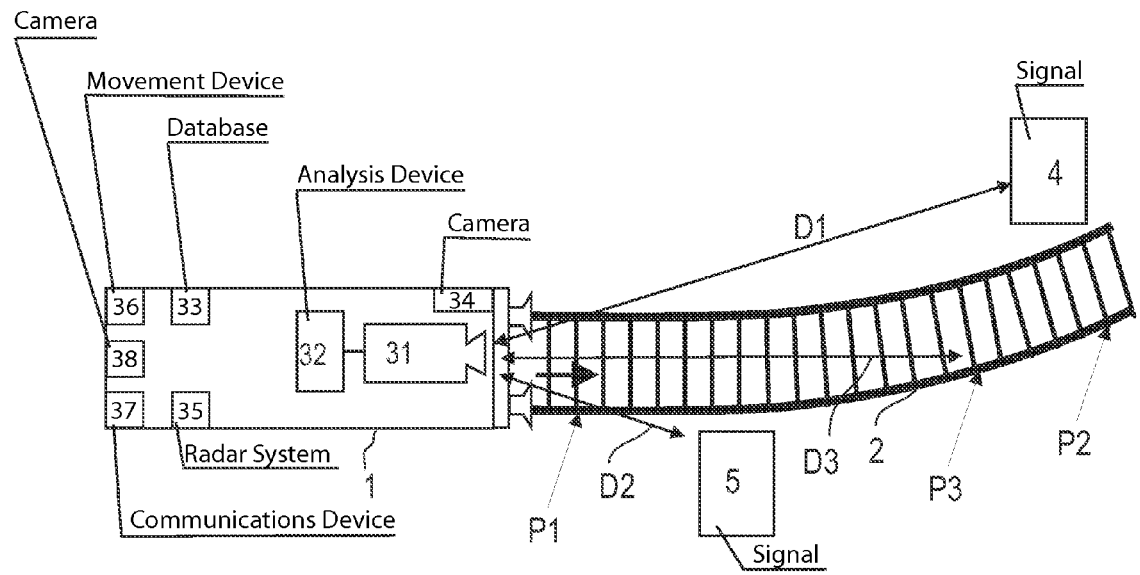
FIG. 1 Exemplary embodiment according to the invention of a system for determining track availability intended to be fitted to a guided vehicle (top view).
Figure 2:
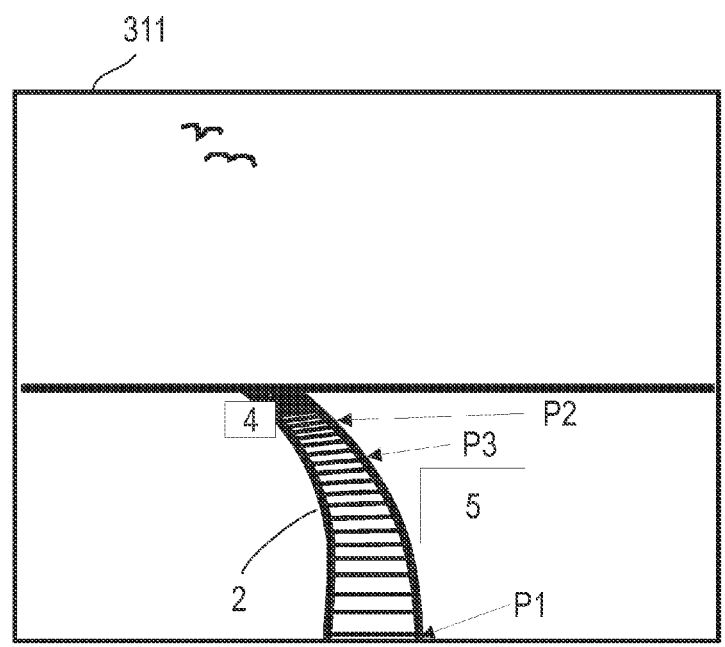
FIG. 2 Example image taken by a camera of the system according to the invention in a given configuration according to FIG. 1.

By way of example, FIG. 1 shows a top view of a guided vehicle 1 moving downstream on a track 2, said guided vehicle 1 including a system for determining track availability according to the invention, said system including:
  at least one camera 31 able to capture at least one image 311, as shown in FIG. 2, of a downstream section of said track 2, said downstream section being a track portion extending from a first point P1 of said track located downstream of said guided vehicle to a second point P2 of said track located downstream of said guided vehicle 1, the distance separating the camera 31 from the second point P2 being greater than the distance separating it from said first point P1;
  at least one image processing and analysis device 32 able to analyze each image 311 (see FIG. 2) taken by each camera 31, to locate said downstream section therein, to determine firstly a downstream safety distance, in particular as a function of the guided vehicle and the movement features thereof, such as movement speed and braking capacity, and secondly an availability state of the track between said first point P1 and said second point P2.

In particular, the processing and analysis device 32 includes a recognition algorithm able to recognize in an image 311 (see FIG. 2) such as that taken by the camera 31, at least one object, such as said track 2 and one or more signals, such as a first signal 4 and a second signal 5. Advantageously, the processing and analysis device also includes a database 33 listing the invariable dimensional features of said objects, such as the track 2 and the signals 4, 5. On the basis of said dimensional features, the processing and analysis device 32 is able to determine a distance separating said camera 31 from said object, for example the distance D1 separating said camera 31 from the first signal 4, the distance D2 separating said camera 31 from the second signal 5 and the distance D3 separating said camera 31 from a third point P3 of said track 2. Thus, the recognition, using the recognition algorithm, of objects whose dimensional features are listed in said database 33 enables the processing and analysis device 32 to establish a scale of distances that can be associated with the representation of said track 2 in said image, since each point P1, P2, P3 and each object, such as the first signal 4 and the second signal 5, corresponds to a distance. Consequently, the processing and analysis device 32 is in particular able to calculate a track length separating said camera 31 from said third point P3, and to monitor in real time firstly an availability state of the track between said guided vehicle and said third point P3 and secondly to check that said track length is equal to or greater than said downstream safety distance.

Preferably, the recognition algorithm uses an inter-correlation function between said image 311 captured by said camera 31 and the images of said track previously saved in the database of said system according to the invention. Said inter-correlation function is for example a fast Fourier transform or a wavelet transform. Said images previously saved, for example during said initial learning phase, are in particular a set of images acquired by said camera 31 during a prior run of the guided vehicle along the different routes liable to be followed by said guided vehicle. Said previously acquired images are preferably stored in an on-board database, i.e. one carried on board said guided vehicle. Said on-board database is then used to compare images 311 acquired in real time by said camera 31 with the images previously acquired and stored in said database in order to localize said guided vehicle and to determine the availability of the track downstream of said guided vehicle.

Preferably, the acquisition frequency of the images intended to form said database depends on the speed of said guided vehicle. Advantageously, in order to obviate any dispersion in the acquisition of said images intended to be saved in said database, a database specific to each guided vehicle is preferably used, a specific database therefore being fitted to a specific guided vehicle. In particular, each image acquired in advance to form said database is preprocessed to prevent or at least to reduce the influence of external conditions that vary depending on the weather, climate or the time said image is acquired, such as a variation in luminosity, the movement of shadows, variations in the position of celestial bodies that could influence the features of the image acquired (position of the sun in relation to the track or to the camera during the day or during the year), the changing seasons, etc. Indeed, the variation of said external conditions may disturb determination of the position of said guided vehicle (localization) by the recognition algorithm and detection of said track availability. To avoid such disturbances, the present invention proposes for example that the recognition algorithm is able to take account of the position of the sun in the sky and of the relief of the scene captured to anticipate shadows and to be able to remove them from the images acquired in real time when the guided vehicle is running, or to add them to images in the database, in particular during said initial learning phase. Moreover, another means for preventing or at least reducing the influence of said external conditions on detection of track availability and said localization of said guided vehicle involves in particular acquiring different images for the same route or run of the guided vehicle under different external conditions, for example under different lighting conditions, to ensure that said database includes images acquired during different external conditions, such as luminosity, for a given route.

Preferably, each image saved and stored in said database is associated with at least one geographical coordinate enabling said guided vehicle to be localized, said geographical coordinate being for example the terrestrial position of said guided vehicle at the time of acquisition of said image intended to be saved and stored in said database, or the linear position thereof relative to the track on which it is moving, said geographical coordinate being for example in this case the kilometer marker along the track which may also be associated with the name of the track to differentiate between the different routes that may be followed by said guided vehicle. Advantageously, once an image acquired in real time by said camera 31 is recognized by the recognition algorithm as matching one of the images previously stored in said database, the processing and analysis device is then in particular able to associate the position of said guided vehicle with said geographical coordinate, for example by matching the position of said guided vehicle with said geographical coordinate if this latter characterizes the position of said guided vehicle at the time of acquisition of the images intended to be saved and stored in said database.

Preferably, said images in the database are classified by zones corresponding for example to different routes liable to be followed by the guided vehicle, or different locations on the route including easily recognizable elements. In particular, the present invention also includes initial determination of the position of a guided vehicle if the position of this latter is entirely unknown, i.e. if the zone in which said guided vehicle is located is notably unknown. During said initial determination, said recognition algorithm compares in particular an image acquired in real time by said camera with all of the images stored in said database in order to determine which zone said guided vehicle is located in. Once said zone has been determined, only the images of said zone and of neighboring zones are used by the recognition algorithm, for example to perform the calculations to determine the position of said guided vehicle and track availability. Advantageously, more precise information on the position of said guided vehicle and the speed of movement thereof helps to reduce the calculations required by said recognition algorithm.

In short, the method and system for determining track availability for a guided vehicle has several advantages over existing methods and systems, enabling the following:

modernization of old equipment and networks of guided vehicles at lower cost: the modernizing/migration of conventional signaling systems (based on track circuits or axle counters) to CBTC systems is lengthy and costly, since it requires these detectors to be rewired and creates problems accessing the track, roads and infrastructure, while the present invention obviates the need for conventional signaling systems based on track circuits or axle counters and enables CBTC to be connected wirelessly to the existing signaling system;

the safe detection of track availability;

communication of a track availability state to other guided vehicles or monitoring systems.

Preferably, the system according to the invention is characterized in that it includes another camera 34 able to capture, at the same time said image is captured by said camera 31, at least one other image of the downstream section of said track, said camera 31 and said other camera 34 thus being able to cooperate with one another to create a stereo image including said image and said other image of said downstream section.

Specifically, the system according to the invention is characterized in that it includes a radar system 35 able to cooperate with said camera 31 or said other camera 34 to detect any objects occupying said downstream section that could potentially impede the movement of said guided vehicle. Advantageously, said radar system 35 is able to securely confirm said determination of the availability state of the downstream section, notably by determining a distance separating said object from said camera 31. In particular, once an object has been recognized in an image acquired by said camera 31, a movement device 36 of said system according to the invention is able to control the positioning of said radar system 35 and/or of said camera 31 as a function of a position of said downstream section or of said object in said image captured by the camera, notably to keep said image centered on said track.

In particular, said system according to the invention is characterized in that it includes a communication device 37 able to send said state signal to at least one other communication device, which may in particular be a communication device of another system for determining track availability designed to be fitted to another guided vehicle or a communication device on the ground, fitted for example to a central control position of one or more guided vehicles. Advantageously, the exchange between guided vehicles of said state signal enables the system according to the invention to update in real time the state of the network of tracks on which the guided vehicle to which it is fitted is liable to run.

Preferably, said system according to the invention includes at least one supplementary camera 38 configured to capture at least one image of an upstream section of said track, said upstream section being a track portion extending from another first point of said track located upstream of said guided vehicle to another second point of said track located upstream of said guided vehicle, the distance separating the guided vehicle from said other second point being greater than the distance separating it from said other first point. In particular, the processing and analysis device 32 is able to analyze each image acquired by said supplementary camera 38 in order to determine whether the guided vehicle has left said downstream section. Advantageously and in particular, the processing and analysis device 32 can communicate to other guided vehicles, via said communication devices, a signal able to indicate that said guided vehicle has left said downstream track section.

The invention claimed is:

1. A system for determining track availability and configured to be fitted to a guided vehicle liable to move downstream, the system comprising:
   at least one camera able to capture at least one image of a downstream section of a track, the downstream section being a track portion extending from a first point of the track disposed downstream of the guided vehicle to a second point of the track disposed downstream of the guided vehicle, a distance separating said camera from the second point being greater than a distance separating said camera from the first point; and
   at least one image processing and analysis device able to analyze each image taken by said camera, to locate said downstream section therein, to determine a downstream safety distance, and an availability state of the track between the first point and the second point, said image processing and analysis device is configured for using known and invariable dimensional features of the track for locating the downstream section in relation to said camera and for determining a distance between the downstream section and said camera.

2. The system according to claim 1, wherein said processing and analysis device is able to determine a track length separating the guided vehicle from at least one third point disposed between the first point and the second point.

3. The system according to claim 1, further comprising a database.

4. The system according to claim 1, further comprising a further camera able to capture at least one image of the downstream section of the track, said camera and said further camera being able to cooperate to create a stereo image of the downstream section.

5. The system according to claim 1, further comprising a radar system able to image the downstream section and to cooperate with said camera.

6. The system according to claim 5, further comprising a movement device able to control a positioning of said radar system and/or of said camera in dependence on a position of the downstream section in the image captured by said camera.

7. The system according to claim 1, wherein said image processing and analysis device is able to detect a discontinuity of the track between the first point and the second point.

8. The system according to claim 1, wherein said image processing and analysis device is able to detect a ground signal downstream of the guided vehicle.

9. The system according to claim 1, further comprising a signaling device able to generate a track availability state signal that can characterize a track availability state of the downstream section, the track availability state signal having a first value when the track is available for the guided vehicle and a second value when the track is occupied.

10. The system according to claim 9, further comprising a communication device able to send the track availability state signal to another communication device.

11. The system according to claim 1, further comprising at least one supplementary camera configured to capture at least one image of an upstream section of the track.

12. A guided vehicle, comprising:
   a system for determining track availability and configured to be fitted to a guided vehicle liable to move downstream, the system containing:
     at least one camera able to capture at least one image of a downstream section of a track, the downstream section being a track portion extending from a first point of the track disposed downstream of the guided vehicle to a second point of the track disposed downstream of the guided vehicle, a distance separating said camera from the second point being greater than a distance separating said camera from the first point; and
     at least one image processing and analysis device able to analyze each image taken by said camera, to locate said downstream section therein, to determine a downstream safety distance, and an availability state of the track between the first point and the second point, said image processing and analysis device is configured for using known and invariable dimensional features of the track for locating the downstream section in relation to said camera and for determining a distance between the downstream section and said camera.

13. A distance-measurement system comprising:
   a distance-measurement sign for assisting in determining track availability and having a sign body;
   a system for determining the track availability and configured to be fitted to a guided vehicle liable to move downstream, said system containing:
     at least one camera able to capture at least one image of said distance-measurement sign; and
     at least one image processing and analysis device able to analyze each image taken by said camera, to locate said distance-measurement sign, to determine a downstream safety distance, and an availability state of a track between a first point and a second point;
   said sign body configured to be attached to a supporting element of a surface of another guided vehicle or beside the track, said sign body having a geometric shape dimensioned to enable the system for determining track availability to determine a distance between the distance-measurement sign and the guided vehicle.

14. A method for determining track availability and determining availability of a track for a guided vehicle liable to be moving downstream, which comprises the steps of:
   capturing at least one image by a camera of a downstream section of a track, the downstream section being a portion of track extending from a first point of the track disposed downstream of the guided vehicle to a second point of the track disposed downstream of the guided vehicle, a distance separating the camera from the second point being greater than a distance separating the camera from the first point; and automatically processing and analyzing each image captured in order to locate the track in each image captured, to determine a downstream safety distance and an availability state of the track between the first point and the second point, wherein known and invariable dimensional features of the track are used for locating the downstream section in relation to the camera and for determining a distance between the downstream section and the camera.

15. The method according to claim 14, which further comprises:

generating a state signal able to characterize the availability state of the track; and transmitting the state signal to at least one other guided vehicle.

* * * * *